United States Patent [19]

Sen Gupta

[11] 4,062,882

[45] Dec. 13, 1977

[54] PROCESS FOR REFINING CRUDE GLYCERIDE OILS BY MEMBRANE FILTRATION

[75] Inventor: Achintya Kumar Sen Gupta, Schenefeld, Germany

[73] Assignee: Lever Brothers Company, New York, N.Y.

[21] Appl. No.: 575,869

[22] Filed: May 9, 1975

[30] Foreign Application Priority Data

May 16, 1974 United Kingdom ............... 21813/74

[51] Int. Cl.² ................................................ C09F 5/10
[52] U.S. Cl. ............................ 260/428.5; 210/23 H; 210/23 F
[58] Field of Search ............... 260/428.5; 210/23 H, 210/23 R, 23 F

[56] References Cited

U.S. PATENT DOCUMENTS

| | | | |
|---|---|---|---|
| 2,930,754 | 3/1960 | Stuckey | 210/23 H |
| 3,043,891 | 7/1962 | Stukey | 210/23 H |
| 3,291,730 | 12/1966 | Martin | 210/22 |
| 3,398,088 | 8/1968 | Okey | 210/23 H |
| 3,544,455 | 12/1970 | Adams et al. | 210/23 H |

FOREIGN PATENT DOCUMENTS

| | | | |
|---|---|---|---|
| 1,417,639 | 4/1972 | Germany | 210/22 |
| 224,252 | 7/1925 | United Kingdom | 210/22 |
| 660,017 | 10/1951 | United Kingdom | 210/23 H |
| 1,313,921 | 4/1973 | United Kingdom | 210/23 H |

OTHER PUBLICATIONS

Michaels, A. S., "Membrane Ultrafiltration" Chemical Technology, Jan. 1971, pp. 56–63.

*Primary Examiner*—Winston A. Douglas
*Assistant Examiner*—John F. Niebling
*Attorney, Agent, or Firm*—Melvin H. Kurtz

[57] ABSTRACT

Crude glyceride oils are refined by membrane filtration under pressure in solutions in organic solvents, particularly to separate phosphatides, which may also be refined according to the invention. The solvents are non-acidic, non-hydroxy solvents, eg esters, hydrocarbons and halogenated hydrocarbons, particularly in which micelles are formed and the solution is contacted under pressure with a semi-permeable membrane, preferably anisotropic and made from synthetic resin. These pass a permeate fraction of low molecular weight components, e.g., the glycerides and solvent, and retain a fraction of higher molecular weight, e.g., phosphatide micelles.

27 Claims, No Drawings

PROCESS FOR REFINING CRUDE GLYCERIDE OILS BY MEMBRANE FILTRATION

BACKGROUND OF THE INVENTION

1. Field of the Invention

The invention is concerned with refining crude glyceride oils for the separation of impurities and in particular with the recovery of triglycerides which constitute the principal components of crude glyceride oils, and phosphatides which are also present, particularly in certain vegetable fats and which are a valuable commodity in their own right.

Fat is recovered from animal tissue by a simple rendering process but the recovery of vegetable oils is more difficult, requiring careful mechanical and heat treatment and often also solvent extraction to increase yield. From both sources a mixture of fat-soluble and fat-insoluble impurities is obtained along with the glycerides. Fat-insoluble impurities, for example fragments of oilseeds and cell tissues, are removed by mechanical means, for example settling, filtration and centrifugation by means of which solid particulate matter is separated.

Fat-soluble impurities remaining in the crude glyceride oils thus obtained vary widely in chemical composition and include proteins, gums, resins, phosphatides, hydrocarbons, ketones and aldehydes. Although certain components, notably tocopherols, vitamins and sterols, are retained as far as possible for their favourable effects in the refined oil, the removal of most fat-soluble impurities is essential, particularly where the oil is required for edible purposes and to ensure stability against oxidation and microbiological deterioration during storage. The complexity of crude glyceride oil refining is due largely to the difficulties attending their removal, but in conventional processes a major part of the process consists in subjecting the crude oil to chemical treatment with the object of converting the fat-soluble impurities to fat-insoluble substances which can than be removed by physical means as described.

With the development in comparatively recent years of high-yield extraction processes aimed at achieving maximum extractive efficiency, these operations have become if anything more difficult.

The vast bulk of the constituents of crude glyceride oils including the glycerides themselves are of course compounds containing fatty acid residues. Of these, lecithin are present in a sludge fraction, also known as phosphatides, and containing in addition sugars, free fatty and other acids. Lecithins are valuable by-products which are widely used as food emulsifiers. Their removal from glyceride oils is indeed essential for this reason. Refining to separate fat-soluble impurities involving treatment with aqueous alkali and/or acid solutions leads to the formation of tenacious emulsions in the presence of these phosphatide components, with consequent considerable loss of oil. Other emulsifying agents likely to be present are the soaps formed by neutralisation of free fatty acid present in the oil, and by saponification of the oil itself during alkali treatment.

In the separation of phosphatides from crude glyceride oils by conventional processes, the crude oil is subjected to treatment with hot water and steam after removing any solvent if this has been used to extract the oil. A substantial proportion of phosphatide is converted to a hydrated, fat-insoluble form. This may be removed from the oil by centrifugation, but the removal of phosphatides is incomplete at this stage since hydration is incomplete. Phosphatide removal, otherwise known as desliming or degumming, is not ordinarily applied to animal fats which are very low in phosphatides, although they may be given a hydration treatment for improving colour.

A further proportion of phosphatides still present in the oil is removed in a soapstock fraction formed by neutralising free fatty acid present with lye.

The remaining portion of the phosphatides in the oil is removed by heating with a mixture of soda and waterglass solutions.

The opportunities for oil loss in the refining of glyceride oils by conventional methods, particularly the removal of fat-soluble impurities, are thus considerable. In addition, both the glycerides and the phosphatides recovered may be damaged by the severe chemical treatment to which they are exposed and the temperatures at which the treatment is carried out. Chemical damage may also be incurred by the complex constituents of the oil which, while present in minor amount, contribute notably to the keepability and nutritional value of the oil, particularly tocopherols and vitamins.

The present invention aims to provide a process in which good yields of oil are obtained without the application of severe chemical treatment. This is effected by dissolving the crude oil or phosphatide-bearing material, in solution in an organic, non-alcoholic, non-acidic solvent, particularly one in which, as in miscella produced by extraction with hydrocarbons of vegetable oils, the phophatides aggregate in micelles. The solution then obtained is brought into contact under pressure with a semi-permeable membrane of such rejection characteristics that permeate and retentate fractions are obtained, the former comprising a substantially phosphatide-free solution of refined oil in the solvent and the latter comprising lecithin. Solvent is then removed from either or both the fractions, recovering products in refined form which exhibit superior characteristics to those obtained by conventional methods.

2. The Prior Art

The separation of particles of molecular dimensions by means of dialysis through a membrane has long been known. According to British Pat. No. 660,017, components of fatty oils or of derivatives thereof containing oily constituents can be separated or extracted by dialysis through a membrane of a high polymeric substance such as rubber, which exhibits swelling with a substance to be dialysed or with a solvent used in the dialysis. In dialysis, the bodies to be separated are placed in a solvent on one side of the membrane while the pure solvent is placed on the other side. In these conditions, the solutes diffuse through the membrane at different rates, a series of successive enrichments then being possible as described in British Pat. No. 224,252 for the fractional dialysis of butters, fats and oils.

Dialysis is now of comparatively little industrial significance except possibly in the form of electrodialysis in which the selective movement of diffusing molecules is promoted by electrical potential, or in clinical applications.

In the separation of molecular species by membrane filtration under pressure, the osmotic pressure generated by solute molecules in a solution is overcome by an opposing pressure applied to the solution on one side of a semi-permeable membrane, with the effect that the smaller molecules pass through the membrane while bigger molecules are retained, thus concentrating solute molecules and, in the case of aqueous solution, hydrated ionic species. Where two or more solute systems coexist in solution, then provided that a membrane of suitable permeability is selected, an enrichment of the larger molecules occurs in the retentate compared with the smaller.

The essential differences between reverse osmosis and dialysis have already been recognised. Dialysis is an irreversible charge leading to increase in entropy, and dependent for its driving force upon a concentration gradient across the membrane, whereas reverse osmosis is effected by the external application of enery (Van Oss, Progress in Separation and Purification 3, 97,1970). Reverse osmosis therefore requires a membrane mechanically resistant to the applied pressure, whereas dialysis requires a concentration gradient across the membrane. For continuity therefore, dialysis requires constant replenishment of fresh solvent on the solvent side of the membrane. The rejection characteristics of a given membrane are scarcely affected by operating conditions.

In reverse osmosis it is the solvent rather than the solute which traverses the membrane and against, rather than with, the concentration gradient (Tuwiner, Diffusion and Membrane Technology, Rheinhold, 1962, p.333). Thus, dialysis results essentially in dilution of solute. Dialysis is unaffected by pressure, except to the extent that any solvent flow through the membrane due to osmosis could be stopped.

Membranes suitable for use in the invention are of two types: homogeneous membranes which are commonly of natural or synthetic rubber or polymerised hydrocarbons or siloxanes and their derivatives, and anisotropic membranes. Homogeneous membranes described hitherto have been proposed for dialysis methods of separation as in U.S. Pat. No. 3,440,264. Anisotropic membranes have been proposed for reverse osmosis in aqueous systems (Van Oss, 1960 loc. cit.), comprising a very thin skin effecting actual separation, on a much thicker porous structure giving the membrane its mechanical stability. Examples include membranes prepared from polycations and polyanions (British Pat. No. 1,881,183), polyamides (Netherlands published Patent Specification No. 6,816,328), polythene (U.S. Pat. No. 3,320,328) and acrylonitrile. Turbulent flow in aqueous reverse osmosis filtration has also been proposed. Purification of liquid hydrocarbon fuels by reverse osmosis has been proposed in U.S. Pat. No. 3,556,990 and U.S. Pat. No. 3,320,328. According to British Pat. No. 1,313,921 lecithin is sterilised by filtration under pressure through a microporous filter which retains contaminant micro-organisms. There has not been any disclosure however of purifying the constituents of glyceride oils by reverse osmosis.

GENERAL DESCRIPTION OF THE INVENTION

This invention relates to refining glyceride oil components and in particular is concerned with removing phospholipids from crude glyceride oils.

Glyceride oils, by which is to be understood both those which are normally solid as well as those normally liquid at ambient temperatures, ie 20° C, are commonly extracted from their sources, particularly vegetable matter, in a crude form which includes an appreciable proportion of phospholipids, in addition to other impurities, for example sugars, free fatty acid, amino acids, peptides, gums and colouring matter. Many phospholipids are a valuable by-product in themselves for the production for example of lecithin and must in any event be removed if undue losses are to be avoided when the fat is neutralised, on account of their strong emulsifying action, or if undue darkening of the oil is to be avoided when the oil is deodorised at higher temperatures.

Soyabean, rapeseed and other oils obtained by solvent extraction from the seeds are recovered as a miscella, ie a solution in the solvent, usually hexane, of the crude oil, which includes in addition to triglyceride oil about 0.2% free fatty acids and 0.6 to 1% phosphatides. These are removed in conventional desliming processes consisting of a series of steps. In the first, the solvent is evaporated from the crude miscella to yield crude oil. This is then steamed at about 80° C in a pre-desliming step to hydrate about 80% of the phosphatides to an insoluble form which is separated from the oil by centrifugation.

The remaining oil, containing non-hydratable phosphatides and free fatty acids, is neutralised with lye and the free fatty acids, together with a minor proportion of the remaining phosphatides, removed as soapstocks. Finally, the neutralised oil is boiled in a post-desliming step with a mixture of aqueous soda and water glass solution converting the non-hydratable phosphatides to water-soluble residues which are removed in the aqueous phase separated from the oil.

The effectiveness of the conventional desliming process is very dependent on the quality of the crude oil, inferior quality oils showing incomplete desliming with a single process pass and for many, one or more operation steps have to be repeated. Moreover, about 20% or often more of the phosphatides is lost by destructive treatment with the alkaline agents. As much as 1% of neutral oil may so be lost with the soapstocks as non-separable emulsions; the organoleptic quality and keepability of the oils and hence edible products made from them, eg margarine, are often adversely affected by oxidative and other chemical changes to which the oil is subjected during the procedure. Considerable amounts of water, lye, soda ash and silicates are needed and give rise to effluent disposal problems. Finally, the refined lecithins obtained from the phosphatides recovered are often not of first quality, and are usually recovered as opaque compositions containing substantial amounts of oil and not pourable at ambient temperatures.

The present invention provides a process for refining crude glyceride oil compositions, the process comprising diluting the composition with an organic solvent as hereinafter defined, contacting a semi-permeable membrane with the resulting solution under pressure to separate constituents of different molecular weight in the composition into retentate and permeate fractions and recovering a refined composition from at least one of said fractions by removing solvent therefrom.

The present invention particularly provides a process for refining crude glyceride oils, especially the separation and, if desired, recovery of phospholipids therefrom, wherein the solvent is one in which micelle formation of phospholipids takes place, and the solution is contacted under sufficient pressure with a membrane of suitable permeability whereby a filtrate comprising solvent and refined oil substantially free from phospholipids and a retentable including oil impurities and substantially the whole of any phospholipids present are obtained, if desired continuing the separation of solvent and refined oil substantially to completion, and thereafter separating solvent from the filtrate and if desired from the retentate, to recover refined oil and/or phospholipids. The refining may be effected continuously or batchwise and in either event may be repeated to improve the yield of oil, if desired with an intervening dilution by the addition of further quantities of solvent, and using a membrane of the same or different characteristics. By repeated dilution the phospholipids may be recovered substantially defatted from either batchwise or continuous operation. In the latter event solvent may be added to maintain the retentate constituents at substantially constant concentration during the removal of glyceride oil in the filtrate. In this way a high filtration rate may be maintained.

The phenomenon of membrane filtration is more widely applied in aqueous systems. Nevertheless, osmotic pressures are generated in non-aqueous systems and membrane filtration may be applied accordingly to such systems. Certain conventional membranes developed for use in aqueous systems may be applied in the present invention, if they are resistant to attack by the oil and/or solvent. Generally speaking, two kinds of membrane appear to be suitable; those based on those synthetic resins which are wholly unaffected by glyceride oils and the common non-polar solvents such as hydrocarbons which may be used in the invention, and those based on elastomers including natural and synthetic rubbers and siloxane polymers. The latter membranes seem to be non-porous and appear to permit the passage of solvent and oil selectively by a process of diffusion through them. The synthetic resin membranes on the other hand appear to be porous.

The permeability characteristics of the elastomeric membranes are determined for the purposes of the invention largely by their thickness, thinner membranes becoming correspondingly more permeable. In use, while the flux rate increases with permeability, thinner membranes become correspondingly more fragile and a suitable compromise must be achieved. Nevertheless a comparatively wide range of membrane thicknesses can be adopted and commercial silicone rubber membranes from 100 to 1500 microns thickness have been found suitable.

Membranes based on synthetic resins, unlike elastomeric membranes, are usually anisotropic in nature, comprising a skin having pores of suitable size for effecting the selective filtration operation and an inner, supporting section which may be of different material which is non-selectively permeable. The degree of selectivity with these membranes is largely determined by the size of the pores in the outer skin, which in their turn determines the size of the molecules which are allowed to pass and which are rejected. This is usually called the cut off limit for a particular membrane and expressed in terms of molecular weight. The cut off limits may be measured indirectly by observing the degree of selectivity exhibited by the membrane towards a reference solute of known molecular weight, usually in an appropriate solvent. In general, membranes with cut off limits between 1.500 and 200.000 are suitable, the range 10.000 to 50.000 being preferred. However, an optimum for each refining exercise should be determined from the point of view of selectivity on one side and flux rate on the other. Too high a cut-off limit would tend to let the phospholipids and other impurities pass through the membrane with the glyceride oil and too low a cut-off limit would tend to obstruct the passage of the glyceride oils, their molecular weight being of the order 1000, and hence reduce flux rate. Suitable examples include the Amicon XM and PM series of membranes known as Diaflo membranes comprising a polysulphone skin e.g. a diphenyl-4,4'-disulphonyl or diphenyl-ether-4,4'-disulphonyl polymer, mounted on a polyethylene supporting layer. Other suitable membranes include those marketed by Rhone-Poulene and comprising a polyacrylonitrile skin, and by Abcor with a polyamide skin.

The membrane may be used in any of the forms conventionally adopted where these are appropriate to the membrane material selected. Thus the membrane may be used in plate, tubular or fibre form, although the elastomeric membranes are less suitable in the latter form. In plate and tubular form at least adequate mechanical support must be provided for the membrane to withstand the hydraulic pressures applied to it to effect filtration. The support may be in the form of porous metal, glass-fibre or other porous rigid construction.

The osmotic pressure generated by phospholipids in organic solutions, particularly in hydrocarbon solutions, is low relative to that exerted by salts in aqueous solution and pressures from 2 to 10 $Kgs/cm^2$ are usually adequate to effect filtration with anisotropic membranes, as in aqueous solution and usually applied in ultrafiltration processes for the concentration of comparatively large molecules such as proteins and carbohydrates in aqueous solutions. Isotropic membranes may require much higher pressures, e.g. 10 to 50 $Kgs/cm^2$, according to membrane thickness. The pressure applied in the process of the present invention to some extent also determines the degree of selectivity of the filtration process, increase in pressure having the effect of apparently diminishing the pore size and thus retaining smaller solute particles in the retentate.

In principle, each of the molecular species present in the solution exercises a measure of osmotic pressure with respect to each of the species of lower molecular weight and may be separated therefrom by a suitably selective membrane. In practice, conventional membranes such as those described usually readily pass solvents and glyceride oil particles while retaining fractions of important impurities such as phospholipids commonly associated with these oils. The solvent is selected to improve the mobility of the liquid system and to this end, in addition to the desirability of facilitating its transmission through the membrane with the glyceride oil particles, the solvent is best selected from those which are comparatively low in molecular weight, not substantially more than that of the glycerides, eg 50–200, especially 60–150, with no substantially greater osmotic pressure. The solvents must be non-acidic and non-alcoholic and solvents of low molecular weight, eg esters and halohydrocarbons are suitable, but it is particularly advantageous to use as a solvent inert hydrocarbons, particularly alkanes, cycloalkenes or simple aromatic hydrocarbons, e.g. benzene and its homologues containing alkyl substituents having up to 4 carbon atoms, since these in addition to improving the mobility of the oil and hence the flux rate of the liquid system through the membrane, bring about a transformation of any phospholipid molecules present, to form micelles. This phenomenon, which can be described as aggregation of a large number of phospholipid molecules under the influence of the solvent to bodies (micelles) of high molecular weight which can be as high as 200,000 in hexane, greatly increases the effective particle size of the phospholipids, enabling them to be wholly retained by membranes permitting the free passage of the oil and solvent particles present. Moreover, the micelles thus formed appear to embed the comparatively small molecules of other impurities such as sugars, amino acids etc which might otherwise escape with the oil through the membrane. Suitable hydrocarbons include benzene, toluene and the xylenes, cyclohexane, cyclopentane and cyclopropane, and alkanes, for example, pentanes, hexanes and octanes and mixtures thereof, for example, petroleum ether boiling between the ranges 40° to 120° C or alkenes. While it is preferred in this connection to use hydrocarbons which are normally liquid at ambient temperature, other solvents may be used which are liquid only under the filtration pressure used. Where the oil is to be separated from the filtrate by evaporating off the solvent, this is preferably of comparatively low boiling point and may in particular be selected to evaporate simply by releasing the filtration pressure. Where phosphatides are not present in significant amounts, other organic solvents as defined e.g. acetone, may be used.

The amount of solvent used to dilute the oil is not critical, bearing in mind the object of diluting to increase mobility and effect micelle formation if any phospholipid is present. Preferably a concentration of oil of from 10 to 50 wt %, preferably 20 to 30 wt %, in the solution is used.

In any event, the solvent adopted, while it may consist of one or more organic liquids, is essentially non-aqueous. Special precautions for removing final traces of water which solvents may contain are not essential, but in general more than about 1% water should not be present.

In carrying out the process of the invention it may be necessary to subject the membranes to be used to treatment rendering it suitable for non-aqueous use. As delivered from the manufacturer, for example, many membranes are already soaked in water or glycerol and must be pretreated successively by contact with water, an intermediate solvent and the diluent solvent to be used in the process. Where the latter is hexane, isopropanol may be used as the intermediate solvent but others will occur to those skilled in the art as suitable. The intermediate solvent must be miscible, if only to a limited extent, both with water and the diluent solvent. It is preferable also to treat the membrane by a similar washing procedure after protracted use, to restore the effectiveness of the membrane.

The temperature at which the filtration is effected is not critical but for the sake of convenience temperatures in the region of ambient, ie 10° to 20° C, are preferably employed. Increase in temperature improves flux rate but on the other hand may soften the membrane material to an unacceptable degree. Temperatures up to about 60° C are however practical possibilities which may offer advantages in certain circumstances e.g. to assist initial solution. Lower temperatures may be used at which solution persists.

In practice the retentate is preferably recycled continuously in contact with a membrane, until a substantial concentration, at least 2 times and preferably 3–10 times, of impurities is built up in the retentate. Beyond this it may be desirable for maintaining high throughput, to resume with a fresh membrane, or one having different characteristics and/or to operate under different conditions, for example after further dilution with the same or a different solvent.

The flow rate of the solution in contact with the membrane is not critical, but in keeping with practice in effecting membrane filtration of aqueous systems, preferably the solution is in turbulent flow to minimise concentration polarisation of retentate at the membrane surface. Means may be provided to ensure turbulence, eg spoilers or stirrers.

The invention is particularly suitable for refining vegetable oils. In many cases these are normally extracted from crushed seeds or polycarps by means of hydrocarbon solvents. The solvents may be directly separated in the invention, for example cottonseed, groundnut, rapeseed, sunflower, safflower and soyabean oils in addition to linseed oil as an example of non-edible oil which like the others is normally liquid. Palm oil, which is semi-solid at ambient temperatures and other oils, for example olive oil and the lauric fats, are customarily directly expressed from the vegetable source and these may then be diluted with an appropriate solvent and processed in accordance with the invention. The process may also be suitable for the treatment of glycerides of animal sources, particularly fish oils, and for so-called vegetable butters, ie higher melting vegetable fats, for example shea nut oil, illipe and sal fat.

Crude glyceride oils from other than natural sources may be refined in accordance with the invention, for example crude synthetic or reconstituted glyceride oils, and oils in which impurities have been formed by use or storage. For example, with repeated use frying oil forms oligomeric forms of unsaturated glycerides. These impurities may be removed by refining the crude oil in accordance with the invention to produce a refined oil lighter in colour and more attractive in appearance for re-use.

The principal constituents of crude glyceride oils are of course triglycerides and the invention is particularly applicable to refining these by separating minor components. These may themselves however be refined in accordance with the invention. For example, crude commercial lecithin, from whatever source, may be refined in accordance with the invention to remove other components, in particular of course, triglyceride oil. Other constituents of crude glyceride oils, for example partial glycerides, may also be removed in accordance with the invention, eg separating triglycerides and other impurities, eg partial glycerides, from them.

Solvent may be removed from the filtrate and, if phospholipids are recovered, from the retentate also, by conventional evaporative processes at atmospheric or subatmospheric pressures. An important feature of the invention, however, resides in the separation of solvent itself from either of these fractions by membrane filtration. For this purpose the solvent must then be selected to present a substantially smaller particle size in the filtration through a membrane, of the same kind or different from that employed in the refining separation step. Where simple hydrocarbon solvents of substantially lower molecular weight than the glycerides in the oil are employed, similar membranes may be suitable under altered conditions. Where the difference in molecular weights is less, then a different membrane may be necessary which exhibits greater selectivity between the two than is necessary for the previous separation of phospholipid from the oil. The filtrate obtained may be substantially free from glycerides and this may be recycled to the oil-extracting stage. If necessary, a final removal of solvent from the retentate in the solvent-recovery stage may be effected by evaporation.

The invention provides a greatly improved refining process. Desliming of miscella is much less dependent for its effectiveness on the quality of the oil and yields of lecithin as well as refined oil can be made substantially quantitative. No chemical treatment is required and the oil in consequence undergoes no chemical degradation. No effluent is left for disposal and the whole refining operation of glyceride oils is greatly simplified. Commercial grades of lecithin which generally contain 40% fat and 60% phosphatides can be obtained by the process in a transparent and pourable condition. Moreover from crude phosphatide-containing compositions of whatever origin substantially fat-free lecithin products can be obtained by the process of the invention.

Essentially the components of crude glyceride oils, the refining of which falls within the scope of the invention, are compounds, from whatever source, of monocarboxylic fatty acids, whether saturated or containing one or more olefinic double bonds which have at least 5 carbon atoms, preferably 8 to 22, and particularly 12 to 18 carbon atoms, and preferably also a glyceridic ester group attached thereto.

In the following Examples membranes were prepared as necessary by contact in successive washing steps with water, isopropanol and hexane. In Examples 1 to 3 crude soyabean was refined containing 1000 ppm of the oil of phosphorus as phospholipids and in Example 4 crude rapeseed oil containing 220 ppm and also 24 ppm of the oil of sulphur as sulphur compounds, all parts in this specification being by weight. In both cases the crude oil was in the form of miscella extracted using hexane from the oil seeds. The phospholipid concentration was increased tenfold in the retentate in Example 2 and trebled in Examples 3 and 4. In each Example, except Examples 6 and 7, the refined oil was recovered by evaporating the solvent from the permeate at reduced pressure and moderately elevated temperature. In other Examples, solvent was also evaporated from the retentate. In all except Example 3 the liquid under filtration in contact with the membrane was maintained in a turbulent condition, either by mechanical agitation or by turbulent flow. Pressure was maintained either by inert gas or by direct hydraulic pressure applied to the solution on the retentate side of the membrane (Examples 1, 3, 4, 6, 11 and 14).

It was evident from all the Examples that a satisfactory separation of various constituents of crude glyceride oil was effected. In most of the Examples also a significant and visually apparent removal of coloured impurities took place, the filtrate being in some cases markedly lighter in colour than the original oil, and substantially free from phosphatides in all cases.

EXAMPLE 1

In a series of tests the crude soyabean miscella was recycled at 20° C, through tubular membranes made of vulcanised dimethyl polysiloxane elastomers of various wall thicknesses (200 to 1500 microns), inlaid in sheaths of porous glass-fibre tubings supporting the soft elastomer membrane. The pumping rate in all the tests was 3 liters/hour. In this Example the following membrane tube dimensions were used:

| Test | 1 | 2 | 3 | 4 | 5 |
| --- | --- | --- | --- | --- | --- |
| Tube dimensions cm$^2$ | | | | | |
| Length: | 435 | 390 | 390 | 400 | 210 |
| Bore: | 0.2 | 0.3 | 0.3 | 0.5 | 0.5 |

Further details appear in Table 1.

Table 1

| Test | Membrane | Filtration Rate (l/m$^2$/hr) | Press. ats. | Oil concn. wt % Crude | Oil concn. wt % Permeate | Phosphorus concen. permeate ppm | Wt % phospholipid rejected by the membrane |
| --- | --- | --- | --- | --- | --- | --- | --- |
| | Silicone rubber Thickness | | | | | | |
| 1 | 200μ | 8 | 10 | 31.6 | 15.3 | <2 | 100 |
| 2 | 300μ | 5 | 30 | 30 | 24 | <2 | 100 |
| 3 | 300μ | 1 | 20 | 20 | 8.4 | <2 | 100 |
| 4 | 500μ | 5 | 30 | 30 | 7.5 | <2 | 100 |
| 5 | 1500μ | 3.3 | 50 | 20 | 3.3 | <2 | 100 |

Lovibond colour measurements at 2 inch layer showed 70 yellow + 8 red for the crude oil and 40 yellow + 5 red for the filtrate oil.

It will be observed that, in addition to the complete rejection of phospholipid by the membrane, a degree of selectivity towards the glyceride is exhibited, in test 5 to a marked extent, by these membranes.

The effect is also clearly shown of the relationship between the thickness of silicone membranes and their selectivity, from the decreasing concentration of oil in the filtrate. Thicker silicone membranes also require higher operating pressures and exhibit lower flux rates.

EXAMPLE 2

Plate membranes DIAFLO PM 10 and XM 50 of Messrs. Amicon GmbH, Witten (Ruhr), Germany, with cut-off limits for molecular weights 10,000 and 50,000 respectively were used at 20° C in the ultrafiltration cell 202 also of Messrs, Amicon, to filter the crude soyabean oil miscella in further tests. This apparatus was equipped with agitator means to maintain turbulence at the membrane surface. 144 mls of filtrate were recovered from 160 mls feed, so that the phospholipids in the retentate (16 mls) were concentrated 10 times compared with the original solution. The results of the experiments are shown in Table 2. Total membrane area was 28.2 cm$^2$.

Table 2

| Test | Membrane | Filtration Rate (l/m$^2$/hr) | Press. ats. | Oil concn. wt % Crude | Oil concn. wt % Permeate | Phosphorus concen. permeate ppm | Wt % Phospholipid rejected by the membrane |
| --- | --- | --- | --- | --- | --- | --- | --- |
| 4 | DIAFLO PM 10 | 60 | 2 | 20 | 17.3 | 26 | 97.4 |
| 5 | DIAFLO PM 10 | 60 | 4 | 20 | 17.2 | 16 | 98.4 |

Table 2-continued

| Test | Membrane | Filtration Rate (l/m²/hr) | Press. ats. | Oil concn. wt % Crude | Oil concn. wt % Permeate | Phosphorus concen. permeate ppm | Wt % Phospholipid rejected by the membrane |
|---|---|---|---|---|---|---|---|
| 6 | DIAFLO XM 50 | 80 | 2 | 20 | 17.8 | 114 | 88.6 |
| 7 | DIAFLO XM 50 | 50 | 4 | 30 | 28 | 130 | 87.0 |

In these tests a substantially lower degree of selectivity towards the glyceride is shown by the membranes which nevertheless retain a very high rejection towards the phospholipid content which is practically complete for the first membrane. Both membranes permit substantially greater flux rates than the rubber membranes of Example 1.

EXAMPLE 3

The crude soyabean miscella was refined at 20° C by membrane filtration in a stacked plate unit ('Ultrafiltrationsgerat' SM 16525 of Messrs. Sartorious-Membranfilter GmbH, Gottingen, Germany) containing 15 membranes (IRIS 3042 Messrs. Rhone-Poulenc, France, cut-off limit at molecular weight ca. 20,000) providing a total filtration area of 0.25 m². The membranes were supported by rigid porous plates and spaced apart by only a few millimeters. The oil entered a corner of the filtration pack through an inlet manifold in the lower part of the pack at a pressure of 2 atmospheres and after traversing in parallel the filtration surfaces, was collected from an outlet port in an upper, diagonally-opposed corner of the pack, and was led back to the feed container to be recycled over the membrane. The filtration was continued until about ⅔ of the feed was filtered. The rate of filtration decreased in the course of filtration. The filtrate was collected from a second outlet port, communicating with collection spaces between adjacent porous supporting plates. The filtrate was evaporated to recover the oil. The details of the experimental results are given in Table 3, where the rate of filtration at the beginning and at the end of the operation are indicated. Each test in this Example demonstrates the effect of concentrating the phospholipid in Lovibond colour of the raffinate from test 10 measured at 2 layer 20 yellow + 5 red compared with 70 yellow + 8 red for the crude oil.

Again an almost complete rejection of phospholipid is shown, with little selectivity towards the oil, with the effect that its concentration in the raffinate is almost as great as in the initial solution.

Table 3

| Test | Press. in ats. | Filtration rate l/m²/h initial | Filtration rate l/m²/h final | Rate of pumping the feed over the membrane (l/h) | Oil concn. wt % Crude | Oil concn. wt % Permeate | Phosph. concn. permeate (ppm) | Wt % Phospholipid rejected by membrane |
|---|---|---|---|---|---|---|---|---|
| 8 | 2 | 26 | 18 | 78 | 33 | 30 | 57 | 94.7 |
| 9 | 2 | 48 | 38 | 105 | 20 | 17 | 75 | 92.5 |
| 10 | 2 | 48 | 46 | 245 | 33 | 30 | 23 | 97.7 |

EXAMPLE 4

A 30% rapeseed oil miscella was filtered, at 30 atmospheres pressure and 20° C, by recycle through a tubular membrane made of vulcanised dimethyl siloxane elastomer of 300 microns thickness, as described in Example 1. The filtration rate was 6 l/m²/h. The oil concentration in the filtrate was 26 wt %. The phosphorus and the sulphur concentrations of the raffinate oil were 0 ppm and 10 ppm respectively.

EXAMPLE 5

This Example illustrates the partial removal of oligomeric triglycerides from frying oil. An Amicon 401S plate-type static filtration module, comprising an IRIS 3042 Rhone-Poulenc membrane with a total membrane area of 40 cm² and equipped with agitator means for maintaining turbulence at the membrane surface, was used to refine soyabean oil, previously used for frying purposes, in 25% solution in hexane at a pressure of 6 kilogrammes per cm² and a temperature of 20° C.

After 50 minutes 300 mls of filtrate were obtained at an average flux rate of 90 liters per m²/hour, yielding 50 grammes of filtrate oil. The oil before and after filtration was analysed for colour and for dimeric and oligomeric triglycerides by gel permeation chromatography. The results appear in Table 4.

Table 4

| | Lovibond colour (2") | Monomeric triglycerides | Dimeric triglycerides | Tri- and higher oligomeric triglycerides | Other components |
|---|---|---|---|---|---|
| Used soyabean oil | 24 yellow 20.1 red | 80.5% | 10.2% | 6.1% | 3.2% |
| ultrafiltrate | 20 yellow 10.3 red | 83.5% | 10.0% | 2.6% | 3.9% | decreasing filtration rate. These tests also show that higher flow rates across the membrane increase filtration rate, and that at sufficiently high rates as in test 10, the fall in flow rate diminishes.

Table 4 shows that the filtered oil is lighter coloured and that oligometric triglycerides, produced during frying as a result of thermal and oxidative polymerisation, are reduced to 40% of the original value by filtration.

EXAMPLE 6

200 grammes of commercial soyabean lecithin containing 40% fat was dissolved to a 10% solution in hexane and recycled through a spiral plate module, at 20° C and a pressure of 4 Kg/cm$^2$, in contact with an IRIS 3042 membrane of 30 cm$^2$ total area.

The module was of stainless steel construction, comprising a spiral channel of rectangular cross-section, 43 cm long $\times$ 0.7 $\times$ 0.4 cm, provided a grooved upper plate mating with a lower plate carrying a sintered polytetrafluroethylene support for the membrane. The hexane solution was introduced at the periphery of the channel. Retentate was collected at the centre of the channel through a pressure-reducing valve and recycled. In 11.5 hours 1650 grammes of filtrate were collected, during which time the flux rate decreased to a quarter of its initial value. The retentate yielded 127 grammes of solid foamy residue of transparent lecithin containing 6% fat.

EXAMPLE 7

The commercial soyabean lecithin of Example 6 was added as a 25% hexane solution to the filtering chamber of the Amicon 401S ultrafiltration module, fitted with a reservoir and an Amicon PM10 membrane of total area 40 cm$^2$.

The reservoir of the module was filled with pure hexane. During ultrafiltration at 20° C and 6 Kg/cm$^2$ pressure, pure hexane was continuously and automatically pumped from the reservoir to the filtering chamber to compensate for the volume already filtered. The operation was stopped after 7 hours, during which time the flux rate remained constant and 1060 mls of filtrate were obtained. The retentate yielded 37 grammes of lecithin with a fat content of 3%. Further analysis showed that the defatted product was practically devoid of free fatty acid and sterols.

EXAMPLE 8

A 25% solution of crude soyabean oil in chloroform was contacted with an IRIS 3042 membrane having a total contact area of 40 cm$^2$, at 6 kilogrammes per cm$^2$ pressure and 22° C in the Amicon 401S module. 300 mls of filtrate were obtained in 1¾ hours at a mean flux rate of 43 liters per m$^2$/hour, yielding 101 grammes of refined oil, containing 158 ppm phosphorus compared to 860 ppm in the original crude oil, the decrease corresponding to 81.6% rejection of phosphorus by the membrane.

EXAMPLE 9

Example 8 was repeated on a 25% solution of the oil in ethyl acetate, yielding 300 mls of filtrate, recovered in 1¾ hours at a mean flux rate of 43 liters per m$^2$/hour and providing 71 grammes of refined oil. The phosphorus content of the refined oil was only 11 ppm, equivalent to 98.7% phosphorus rejection by the membrane.

EXAMPLE 10

63 parts of crude mixed fish oil obtained from different species of fish were refined by dissolving in 180 parts of hexane and subjecting the solution obtained to contact at 20° C and 6 kilogrammes per cm$^2$ pressure, with an IRIS 3042 membrane of 40 cm$^2$ contact area, arranged in the Amicon 401S ultrafiltration module.

300 mls of filtrate were obtained in 40 mins at an average flux rate of 112 liters per m$^2$/hour, yielding 56 grammes of refined oil which with the crude oil was analysed as reported in Table 5.

Table 5

|  | Lovibond colour (2") | Iodine Value | Phosphorus | Nitrogen |
|---|---|---|---|---|
| Crude starting oil | 10.5 yellow 20.4 red | 140 | 28 ppm | 61 ppm |
| Filtrate oil | 9.5 yellow 10.3 red | 137 | 5 ppm | 40 ppm |

Table 5 shows that the ultrafiltration brings about an appreciable removal of dyestuffs and phosphorus, whereas the Iodine Value remained practically unchanged, indicating no fractionation of saturated and unsaturated glycerides.

EXAMPLE 11

The effect on permeate flow rates of pressure and concentration of the retentate was examined in a series of tests carried out on a miscella of 30% crude soyabean oil containing 2.4% lecithin, in hexane. The solution was passed at 20° C under pressure and at a constant linear velocity of 0.38 meters/second, through the spiral module described, fitted with an IRIS 3042 membrane.

The average flow rate was measured during a first stage giving a fourfold concentration and during a second stage in which a further threefold concentration was carried out, giving a total twelvefold concentration.

The twelvefold retentate from the first test which had a total fatty acid content of 47%, was diluted with hexane back to a fatty matter content of 30% and further concentrated threefold, making thirty-sixfold in all. Further data appears in Table 6 and illustrates that flow rate falls as filtration progresses but increases with pressure, which also improves separation.

Table 6

| Test | 1 | 2 | 3 |
|---|---|---|---|
| Pressure Kg/cm$^2$ | 6 | 4 | 2 |
| Flow rate l/m$^2$/hour |  |  |  |
| Initial | 130 | 117 | 112 |
| Average 4-fold concen. | 100 | 89 | 93 |
| Average 12-fold concen. | 56 | 76 | 68 |
| Average 36-fold concen. | 30 |  |  |
| Max. phosphorus content permeate ppm oil | 9 | 16 | 100 |
| Residue fatty content percentage of the retentate (After removing hexane) | 57 | 45 | 41 |

The residue from the final retentate of the first test corresponded closely in phospholipid content to commercial lecithin but was pourable even at 5° C and transparent. Its viscosity at 20° C was 6,100 cp and 91% transparency by turbidometer. This compared with commercially prepared lecithin from the same charge of crude oil, with a viscosity of 7,970 cp and transparency 10%.

Flux rate is affected by increase in concentration in the retentate both of phosphatides and glycerides, the latter increasing viscosities. Thus, the viscosity of soyabean miscella in hexane increased from 0.7 cp at 30%, to 0.9 at 40% and 2 cp at 50%, these giving average flow rates of 89,64 and 37 liters/m$^2$/hour at 4 Kg/cm$^2$ pressure through an IRIS 3042 membrane fitted in the spiral module described.

The phospholipids on the other hand appear to affect flux rates by concentration polarisation effects at the membrane face.

after removal of solvent were analysed as shown in Table 8.

Table 8

|  | Volume | Average flux rate | Total fatty content in filtrate | Lovibond 2" of oil | | Iodine Number of oil |
|---|---|---|---|---|---|---|
| Fr 1 of filtrate | 100 ml | 50 l/m²h | 14.1 g | 10<br>9.0 | Yellow<br>red | 144.5 |
| Fr 2 of filtrate | 100 ml | 45 l/m²h | 16.4 g | 10<br>9.5 | Yellow<br>red | 145.6 |
| Fr 3 of filtrate | 100 ml | 38 l/m²h | 19.2 g | 10<br>9.8 | Yellow<br>red | 145.1 |
| Retentate | 90 ml | — | 28.3 g | 10<br>29<br>6 | Yellow<br>red<br>blue | 140.3 |
| Starting oil | — | — | 20 g | 10.5<br>20.4<br>2 | Yellow<br>red<br>blue | 142 |

The Example demonstrates that a balance should be selected, between the extent of concentration, the time available to effect it, and the volume of circulating fluid.

EXAMPLE 12

A 30% crude rapeseed miscella in hexane was refined by circulation at 20° C and 6 Kg/cm² pressure, through the Amicon 401S module equipped with magnetic stirring and an Amicon PM10 membrane. A twelvefold concentration of the circulated retentate was effected at an average flux rate of 75 liters/m²/hour. The phosphorus content of the oil in the permeate was nil, compared with 256 ppm of the oil in the original oil, corresponding to 100% phosphorus rejection. The sulphur content of the oil in the permeate was 9 ppm of the oil, from the original 25 ppm in the crude oil, corresponding to 61% rejection by the membrane.

After replacing the membrane by an IRIS 3042 the Example was repeated to a tenfold concentration at 4 Kg/cm² pressure, at an average rate of filtration of 41 liters/m²/hour. Both the phosphorus and the sulphur content of the oil in the filtrate was 8 ppm by weight of the oil.

EXAMPLE 13

Crude soyabean oil miscella, as described in Example 11, was refined by circulation at 20° C, and 6 Kg/cm², through an Amicon Diaflo PM10 membrane, fitted in the 401S module, a twelvefold concentration being effected. The crude oil and the oil recovered from the permeate were analysed for trace metals.

The Example was repeated using an IRIS 3042 membrane on a second soyabean miscella. The results appear in Table 7, showing a marked decreased in each case except for the very low copper content in the first oil.

Table 7

|  | Metal content ppm of oil | | | |
|---|---|---|---|---|
|  | Ca | Cu | Fe | Mg |
| Crude BO, Sample 1 | 136 | 0.04 | 1.09 | 89.2 |
| Permeate oil I | 2.9 | 0.04 | 0.05 | 1.5 |
| Crude BO, Sample II | 122 | 0.17 | 4.92 | 120 |
| Permeate oil II | 3.4 | 0.06 | 0.04 | 2.0 |

BO = soyabean oil.

EXAMPLE 14

390 mls of a 25 wt % solution of crude whale oil in acetone were filtered at 20° C and 6 Kg/cm² pressure, in the Amicon 401S module using an IRIS 3042 membrane. 300 mls of filtrate were taken off in three fractions of 100 mls each and the average flux rate for each measured. The starting oil and the filtrate oil recovered The results show that a significant enrichment of total fatty matter took place in the retentate, the Iodine Number of which was somewhat lower than that of the filtrate oil. A substantial improvement in colour of the oil was obtained in the filtrate.

What is claimed is:

1. A process for refining crude glyceride oil compositions comprising the steps of
    a. diluting the composition with a non-acidic non-alcoholic organic solvent to provide a more mobile and essentially non-aqueous solution containing glycerides and components of greater effective molecular weight in the solution,
    b. contacting one side of a semi-permeable, non-porous, anistropic membrane having a retention cut-off limit between 1,500 and 200,000 with the resulting solution under positive pressure from 5 to 50 kgs/cm² until constituents of the composition, of different molecular weight are separated into retentate and liquid permeate fractions in contact with the respective sides of the membrane containing the glyceride oil in substantially the same concentration in the two fractions, in solution in the said solvent,
    c. recovering at least one liquid composition comprising one of said fractions and removing solvent therefrom to provide a refined product.

2. Process according to claim 1 wherein the said composition comprises a mixture of glyceride and phosphatide constituents and the solvent is one in which phospholipid micelles are formed.

3. Process according to claim 2 wherein the said composition comprises crude vegetable or animal oil containing phosphatides.

4. Process according to claim 2 wherein the said composition comprises crude phosphatide from a glyceride oil.

5. Process according to claim 1 wherein the said composition comprises soyabean or rapeseed oil.

6. Process according to claim 1 wherein the molecular weight of said solvent is not substantially more than that of glycerides present in glyceride oils.

7. Process according to claim 6 wherein the molecular weight of the solvent is from 50 to 200.

8. Process according to claim 6 wherein the solvent comprises an inert hydrocarbon or halogenated inert hydrocarbon.

9. Process according to claim 8 wherein the solvent comprises hexane.

10. Process according to claim 7 wherein the solvent comprises an ester.

11. Process according to claim 10 wherein the solvent comprises an ester of a lower fatty acid with a lower monohydric alcohol.

12. Process according to claim 7 wherein the solvent comprises an aliphatic carbonyl compound.

13. Process according to claim 12 wherein the solvent comprises acetone.

14. Process according to claim 7 wherein the composition is diluted with sufficient solvent to provide a solution of from 10 to 50 wt % of the composition therein.

15. Process according to claim 7 wherein the separation is continued with intervening dilution with said solvent.

16. Process according to claim 15 wherein solvent is added to maintain constituents in the retentate at substantially constant concentration during separation.

17. Process according to claim 7 wherein the solvent is removed from at least one of said fractions by evaporation.

18. Process according to claim 7 wherein the solution is maintained in turbulent flow in contact with the membrane.

19. Process according to claim 1 wherein the membrane comprises an elastomer.

20. Process according to claim 18 wherein the membrane is anisotropic and comprises an oil-resistant synthetic resin.

21. Process according to claim 20 wherein the retention cut-off limit of the membrane is from $1.5 \times 10^3$ to $2 \times 10^5$.

22. Process according to claim 21 wherein the membrane material comprises polyacrylonitrile.

23. Process according to claim 20 wherein the membrane comprises a polysulphone or polyamide.

24. Process according to claim 1 wherein the pressure applied is from 2 to 50 Kg/cm$^2$.

25. Process according to claim 24 wherein the membrane comprises an anisotropic, oil-resistant synthetic resin membrane and the pressure applied is from 2 to 10 Kg/cm$^2$.

26. Process according to claim 1 wherein the membrane is contacted at a temperature from 10° to 60° C.

27. Process according to claim 1 wherein the said solution comprises miscella obtained by extracting vegetable oil including phosphatides using said solvent.

* * * * *